United States Patent [19]

Mizuhara et al.

[11] 4,325,754

[45] Apr. 20, 1982

[54] FLEXIBLE BRAZING ALLOY TAPE AND METHOD OF MAKING SAME

[75] Inventors: Howard Mizuhara, San Mateo; Ronald W. Cox, Menlo Park, both of Calif.

[73] Assignee: GTE Products Corporation, Stamford, Conn.

[21] Appl. No.: 216,239

[22] Filed: Dec. 15, 1980

[51] Int. Cl.³ .................... B23K 35/22; C23C 1/12
[52] U.S. Cl. .................................. 148/22; 148/24; 260/998.18; 264/111; 264/112; 524/440
[58] Field of Search ............... 260/33.4 R, 42.11; 148/22

[56] References Cited

U.S. PATENT DOCUMENTS 2,765,507 10/1956 Wolf et al. ............... 260/42.11
3,171,734 3/1965 Benson et al. ............. 75/0.5

*Primary Examiner*—Joseph L. Schoter
*Assistant Examiner*—N. Sarofim
*Attorney, Agent, or Firm*—John F. Lawler

[57] ABSTRACT

A flexible brazing alloy tape with a binder having less than 3% by weight total organic content and no more than about 1% by weight residual ash after melting is provided by use of a polyacrylic acid polymer, glycerol and water as a vehicle in which the powdered alloy is dissolved to form a slurry prior to casting. The polyacrylic acid polymer has a relatively low viscosity defined by a molecular weight of about 450,000. The slurry is deposited on a substrate and is dried and the resulting flexible low organic self-supporting tape is removed from the substrate to be formed into desired shapes as preforms for brazing. Alternatively a brazing alloy tape comprising a binder having a similarly low total organic content is produced by mixing the powdered alloy with polyvinyl alcohol, glycerol and water and thereafter casting the tape as described above.

3 Claims, No Drawings

FLEXIBLE BRAZING ALLOY TAPE AND METHOD OF MAKING SAME

BACKGROUND OF THE INVENTION

This invention relates to brazing alloys and more particularly to an improved flexible brazing alloy tape containing metal brazing powders including nickel-base alloys, manganese-base alloys, copper-base alloys, cobalt-base alloys and copper.

The advantage and utility of flexible brazing alloy tapes are in part measured by the organic content of the binder which holds the alloy powders together. Current technology, because of the brazing alloy and base metal chemistry, often requires that brazing be carried out in a vacuum, for example, in the order of $1 \times 10^{-4}$ mm Hg. A major problem confronting the industry in the use of such tapes is the condensation of the organic elements on furnace chamber walls requiring expensive and time consuming cleaning operations at a freuquency generally proportional to quantity of organic material in the binder. Such organic condensation also tends to foul vacuum pump rotors and ultimately renders the pump inoperative and/or causes high overall maintenance or replacement costs of expensive pump and vacuum components.

In additin to the above, the amount of carbonaceous residue in a joint brazed with alloy powders held together with an organic binder is determined by the organic content of the binder. Since such residue restricts alloy flow and promotes carbon pickup in many alloy systems, the quality of the brazed joint is degraded as the organic content of the binder increases.

U.S. Pat. No. 2,833,030 describes binders having an organic content of 10% to 20% by weight of the composite system. In addition the patent specifies casting solvents of the hydrocarbon type which impose stringent ventilation requirements on the manufacturing process to meet safety standards for both fire and toxic inhalation hazards.

U.S. Pat. Nos. 3,166,402 and 3,171,734 describe preferred brazing alloy systems with binders having 8% by weight of organic material which limit the use of such systems to brazing applications which can tolerate this level of organic content.

This invention is directed to flexible composite brazing alloy tape systems which overcome the foregoing problems and disadvantages by substantially reducing the organic content from that of prior art systems.

OBJECTS AND SUMMARY OF THE INVENTION

A general object of the invention is the provision of a flexible brazing alloy tape having a minimum content of organic material.

Another object is the provision of a method of making a brazing alloy tape of this type.

These and other objects are achieved by use of low viscosity polyacrylic acid polymer together with glycerol as a binder system for brazing alloy powders. An alternative though less preferable agent for this purpose is polyvinyl alcohol and glycerol.

DESCRIPTION OF PREFERRED EMBODIMENT

In accordance with the invention a binder that is water soluble and has a very low total organic content is used to prepare flexible brazing alloy tape. The binder comprises a resin selected from a group consisting of polyacrylic acid polymer and polyvinyl alcohol and a plasticizer consisting of glycerol. The preferred binder is a low viscosity polyacrylic acid polymer and glycerol, low viscosity as used herein meaning a molecular weight of approximately 450,000.

The metal brazing powders which constitute the major component of the brazing tape embodying this invention includes powders having nickel and copper bases and a copper powder.

Typical of such nickel-base alloy powders are those designated as AMS 4776-4779 inclusive and consist of powders in the following weight ranges:

| | |
|---|---|
| Chromium | 0-17% |
| Boron | .5-4% |
| Silicon | 3-5% |
| Iron | 0-5% |
| Nickel | Balance |

In the examples given below the basic criteria for satisfactory brazing alloy tapes were tapes that
1. had less than 3% by weight total organic content,
2. were flexible and tough, and
3. produced very low ash (about 1% by weight of total organic content) when melted.

EXAMPLE I

AMS 4777 was atomized and screened to approximately −150 mesh. AMS 4777 has the following nominal composition by weight:

| | |
|---|---|
| Chromium | 7% |
| Silicon | 4% |
| Boron | 3% |
| Iron | 3% |
| Carbon | .5% |
| Nickel | Balance |

A solution of 5% by weight glycerol, 10% by weight of polyacrylic acid polymer (molecular weight approximately 450,000) manufactured and sold by B. F. Goodrich Company as Carbopol 907, and 85% by weight water was prepared. The AMS 4777 powder was sprinkled slowly into this solution and gently stirred to form a slurry, the powdered metal being added to the solution in a 90:10 ratio. The slurry was then allowed to mix gently overnight. The slurry was then cast by the well-known doctor blade apparatus having a 0.75" blade opening onto a resin sheet such as Mylar and was thereafter dried. The resulting brazing alloy tape had a uniform thickness of 0.050".

The following systems were prepared and tested with the results as indicated, the amounts being given in percent by weight:

| POLYACRYLIC ACID POLYMER | GLYCEROL | |
|---|---|---|
| 1. 0.86 | 2.16 | Slip too liquid, non drying |
| 2. 1.61 | 1.61 | Slip too heavy, poor casting |
| 3. 0.80 | 1.50 | Slip doesn't suspend solids, poor casting |
| 4. 1.09 | 1.09 | Retains air, stringy slip |
| 5. 1.09 | 0.55 | Good casting slip, best flexibility on drying |
| 6. 0.88 | 0.54 | Excellent casting, lower |

| POLYACRYLIC ACID POLYMER | GLYCEROL | |
|---|---|---|
| | | strength on drying |

As noted above, the binders for satisfactory tapes contain approximately 1% to 3% by weight of total organic constituent with polyacrylic acid polymer present in the range of 0.87 to 1.15% by weight and glycerol present in the range of 0.5% to 0.6% by weight.

This low organic binder produced a strong flexible tape with a correspondingly low ash residue (approximately 1% by weight of organic content on melting of the alloy system. In addition the binder components are water soluble and produce a non-combustible, non-toxic casting slurry.

EXAMPLE II

A binder system was made essentially as described in Example I using 0.5% to 1.5% by weight of polyvinyl alcohol and 1.0% to 1.5% by weight of glycerol.

The following binders were prepared using the following amountes, in percent by weight, of polyvinyl alcohol (PVA) and glycerol and the balance AMS 4777, with the results indicated:

| A | 1% PVA - 0.5% Glycerol | Weak, brittle tape |
|---|---|---|
| B | 0.5% PVA - 1.0% Glycerol | Flexible, tough tape |
| C | 1.5% PVA - 0.5% Glycerol | Weak, brittle tape |
| D | 1% PVA - 1.0% Glycerol | Flexible, tough tape |
| E | 0.5% PVA - 1.5% Glycerol | Weak, brittle tape |
| F | 1.5% PVA - 1.0% Glycerol | Very flexible, tough tape |
| G | 1.0% PVA - 1.5% Glycerol | Flexible, tough tape |

The tapes of B, D, F and G were rated excellent. The tapes produced with polyvinyl alcohol had some cosmetic faults such as color variations and slight blistering and therefore are the less preferred form of the invention. However, polyvinyl alcohol is more economical than polyacrylic acid polymer and has utility and advantage in applications where such cosmetic faults can be tolerated.

What is claimed is:

1. A brazing alloy composition comprising a binder consisting of a low viscosity polyacrylic acid polymer and glycerol and the balance a nickel-base alloy powder.

2. A flexible brazing alloy composition comprising a binder consisting essentially of 0.87 to 1.15% by weight of a low viscosity polyacrylic acid polymer and 0.5% to 0.6% by weight glycerol, and the balance substantially all a nickel-base alloy powder.

3. The method of preparing a self-supporting flexible tape for use in brazing, consisting of the steps of
preparing a mixture consisting of an aqueous solution of low viscosity polyacrylic acid polymer, glycerol and a metal brazing powder selected from the group consisting of nickel-base alloys, copper-base alloys, and copper,
casting said mixture into a tape,
drying the tape so that the tape will consist of from about 0.87 to 1.15% by weight of polyacrylic acid polymer, 0.5% to 0.6% glycerol and the balance said brazing powder.

* * * * *